INVENTOR.
Millard E. Fry
BY
Willits Hardman and Fehr
Attorneys

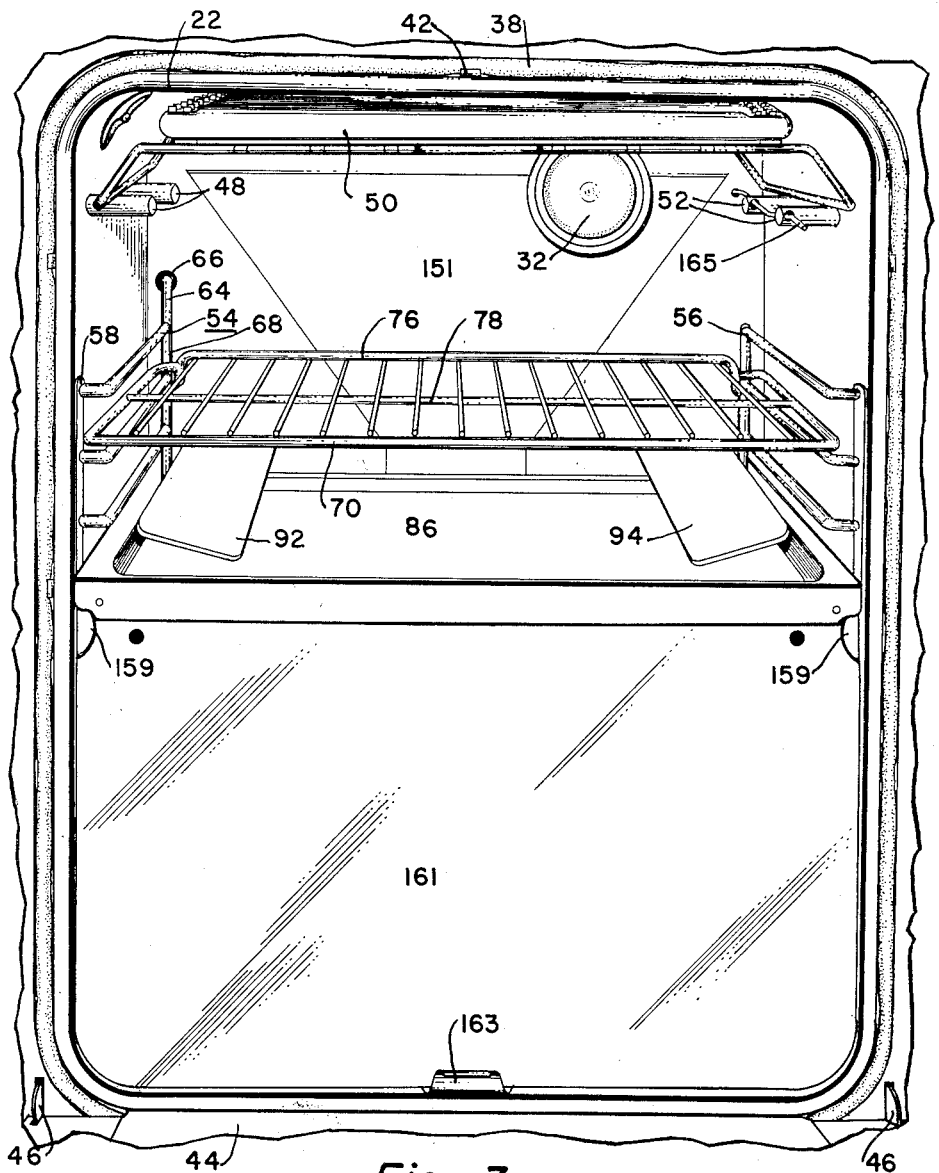

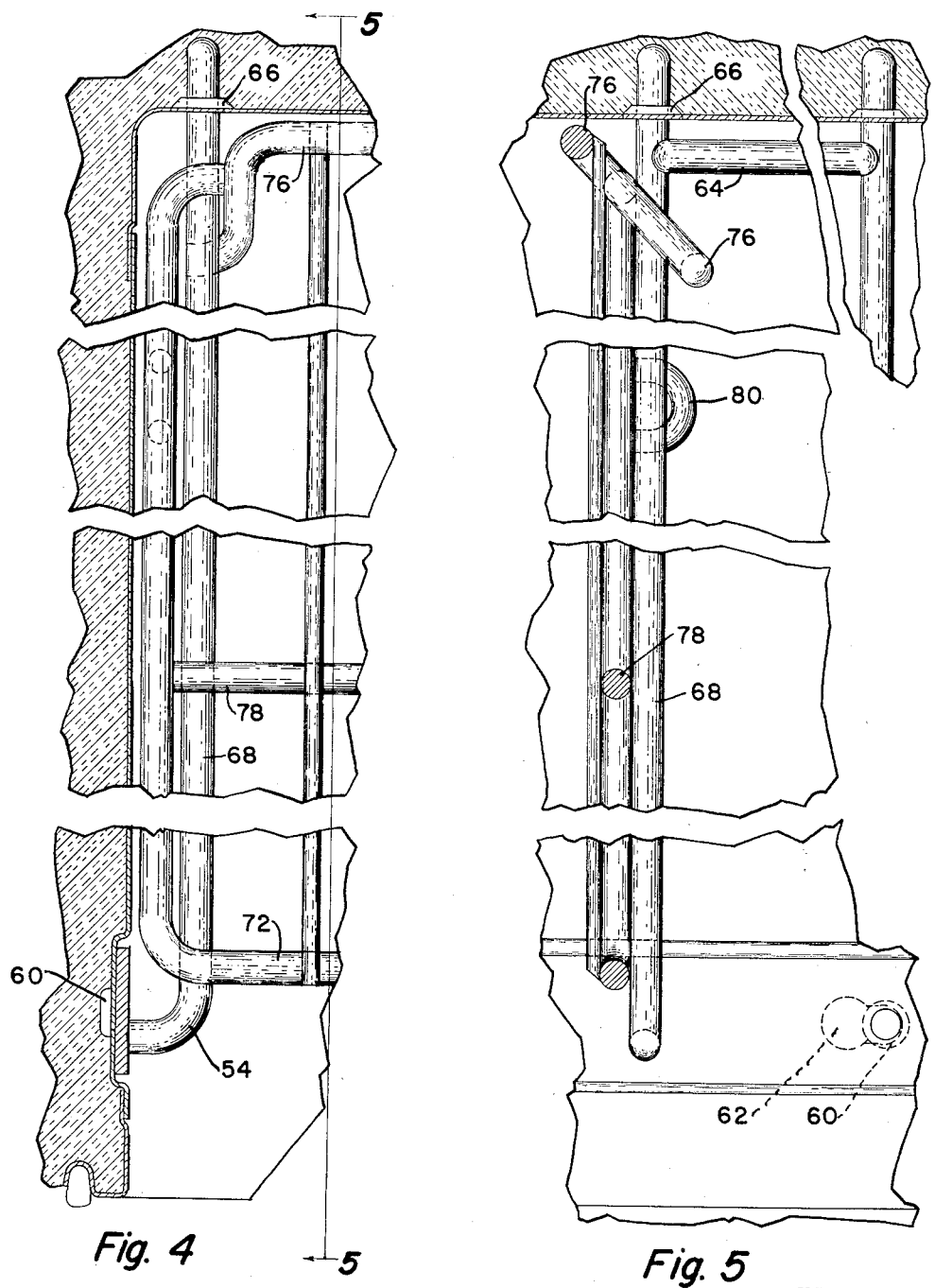

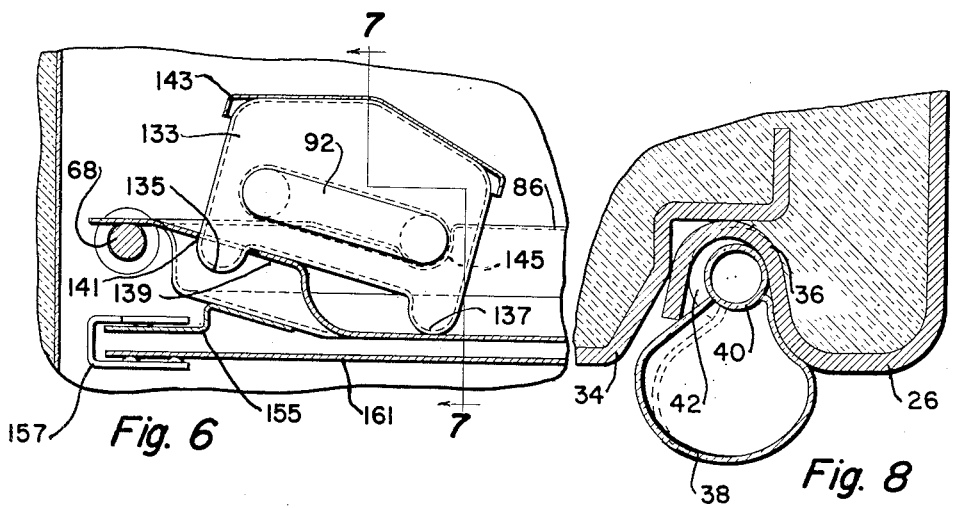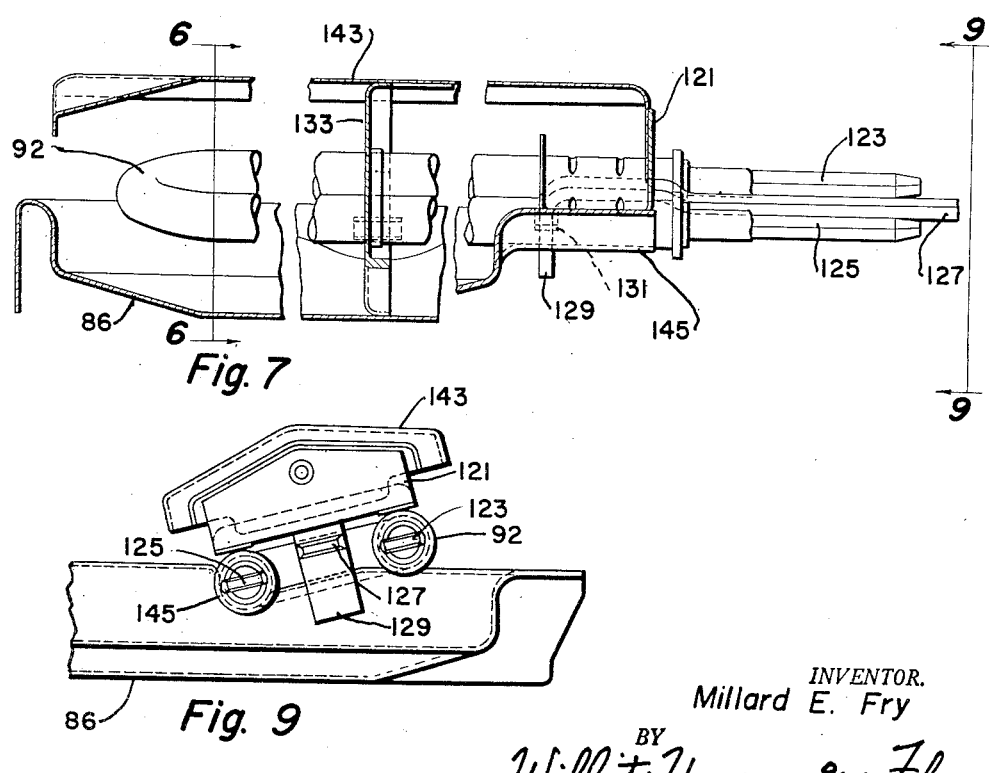

United States Patent Office 2,767,298
Patented Oct. 16, 1956

2,767,298

DOMESTIC APPLIANCE

Millard E. Fry, Dayton, Ohio, assignor to General Motors Corporation, Detroit, Mich., a corporation of Delaware Application November 19, 1952, Serial No. 321,321

3 Claims. (Cl. 219—35)

This invention relates to a domestic appliance and more particularly to domestic electric ovens.

It is an object of my invention to provide an electric oven with a smooth easily cleaned oven liner provided with simple inexpensive readily removable shelf guides and shelves.

It is another object of my invention to provide an electric oven in which the spillage is easily caught and removed.

It is another object of my invention to produce an electric oven which has good heat distribution provided by simple readily removable and readily cleanable elements.

It is another object of my invention to provide an improved arrangement in which a domestic oven can be used as a single large oven or divided into two separate and independent sub-compartments and particularly in which the partition may be used to catch spillage in either arrangement.

These objects are attained in the form shown by providing a smooth easily cleaned box-shaped oven liner having wire shelf guides removably mounted upon its sides. The shelf guides support a simplified form of removable shelves as well as a shallow pan which may be used to catch spillage and which also may be placed intermediate the top and bottom of the oven to divide the oven into upper and lower sub-compartments. This pan carries a removable drop door and at its side supports U-shaped tubular sheathed heating elements which fit into receptacles in either position of the pan. Beneath the pan there is provided a second tubular sheathed heater for the lower sub-compartment. A broil heater is also provided in the top of the oven compartment. The door is provided with a gasket type door seal.

Further objects and advantages of the present invention will be apparent from the following description, reference being had to the accompanying drawings wherein a preferred form of the invention is clearly shown.

In the drawings:

Figure 3 is a view similar to Figure 2 but with the drop door in position to close the lower sub-compartment;

Figure 4 is a fragmentary sectional view taken substantially along the line 4—4 of Figure 1 showing one of the shelf guides and a portion of one of the removable shelves;

Figure 5 is a fragmentary sectional view taken substantially along the line 5—5 of Figure 4;

Figure 6 is a sectional view taken substantially along the line 6—6 of Figure 7;

Figure 7 is a sectional view taken substantially along line 7—7 of Figure 6;

Figure 8 is a fragmentary sectional view showing the door jam and the gasket seal; and Figure 9 is a sectional view taken along the line 9—9 of Figure 7.

Figure 1:
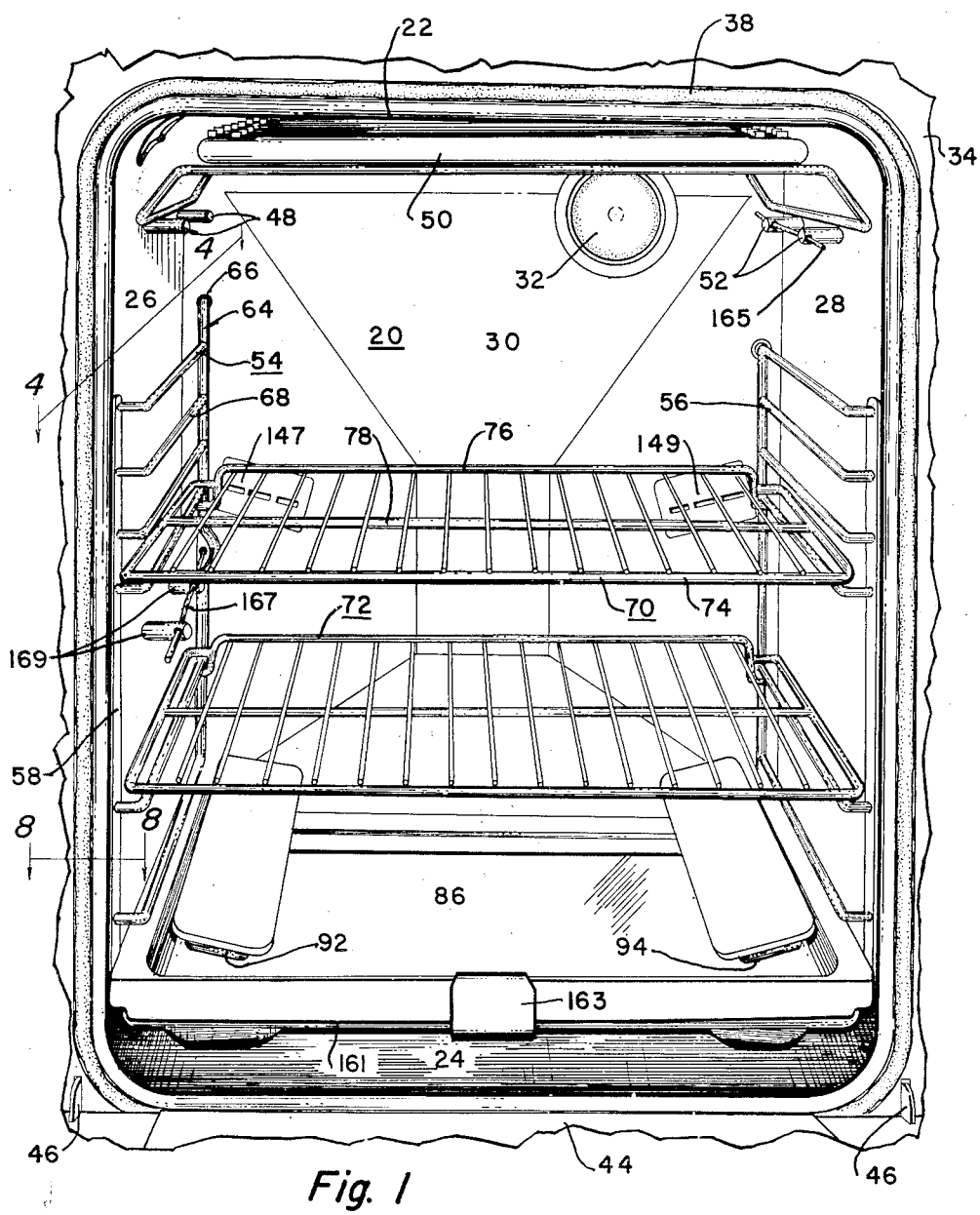
Figure 1 is a perspective view of an oven embodying one form of my invention arranged to provide a single large compartment.

Referring now to the drawings and more particularly to Figure 1, there is shown a substantially box-shaped smooth surfaced oven liner 20 having a substantially flat top 22, a substantially flat bottom 24, and flat side walls 26 and 28 and a substantially vertical rear wall 30. The rear wall 30 is provided with an illuminating light 32. The liner 20 is fitted into an aperture in a range frame front 34 which provides a structural front wall for the range. The outturned flange of the oven liner, as shown in Figure 8, has a curled flanged edge 36. A tubular gasket seal 38 of Fiberglas or silicone rubber is provided with a bead 40 which is clamped and held in place by a projection 42 which is curled around the bead 40 in order to clamp the seal 38 in place. The compartment enclosed by the oven liner 20 is adapted to be closed by an oven door 44 pivoted to the bottom of the door jam by the hinge elements 46. This door 44 cooperates with the gasket door seal 38 to substantially seal the oven compartment from the entrance of cold air. By excluding cold air from the oven compartment, more even baking temperatures are attained throughout the oven and the heating efficiency and economy is increased.

The side wall 26 is provided with two pins 48 which support one side of the broil heating means 50. The other side of the broil heating means 50 is supported by the pegs 52 upon the side wall 28. The side walls 26 and 28 are provided with shelf guides 54 and 56. Taking the shelf guide 54 as an example of both, it includes a front vertical member 58 of comparatively thin strip metal to which is riveted a projecting button 60 which projects through a keyhole-shaped aperture 62 in the front portion of the side wall 26 of the liner 20. The shelf guide 54 is also provided with a rear vertical support 64 in the form of a vertical wire having its upper and lower portions bent rearwardly so that they extend through upper and lower apertures 66 in the rear wall 30 of the liner 20. These apertures may be provided with bushings of a nonmetallic heat resistant material. Extending between the front and rear vertical members 58 and 64 are six horizontal wire shelf guides 68 having their front ends turned outwardly and riveted or welded to the vertical member 58 and their rear ends welded to the vertical member 64. The shelf guide 56 is constructed in a similar manner.

The shelf guides 54 and 56 may be removed simply by lifting up the front portion so that the button 60 may be removed from top of the keyhole slot 62 after which the shelf guide 54 may be removed from the oven simply by pulling outwardly so that the rear vertical member 64 is pulled out of the apertures 66 in the rear wall 30.

The shelf guides 54 and 56 may be used to support shelves of a variety of shapes and types. I have provided a simple form of slideable and removable type wire shelves 70 and 72. These shelves are identical and therefore the shelf 70 will be described in detail as an example of each. The shelf 70 includes a heavy U-shaped wire bar 74 having its rear portions welded to the rear cross bar 76. This rear cross bar 76 has turned down ends which extend beneath the shelf guides to prevent tipping by the weight upon the front when the shelf 70 is pulled out. An intermediate cross bar 78 of heavy wire extends between the sides of the bar 70. The front and rear portions of the U-shaped bar 74 as well as the intermediate cross bar 78 rest at either end upon one of the horizontal shelf guides. The rear portion of the U-shaped member 74 may be provided with a downwardly extending projection 80 to prevent the accidental removal or pulling out of the shelf 70 beyond a safe limit. This projection 80 will engage the outwardly extending front end portion of the shelf guide upon which rests the shelf 70.

When the oven is to be used as shown in Figure 1, there is placed on the lowermost shelf guides a shallow pan 86 extending from side to side and front to rear within the oven compartment. This shallow pan 86 serves at least three useful purposes. It catches any spillage which may result of liquids and foods boiling out or overflowing from any container above it. This prevents such spillage from falling upon the bottom 24 of the oven liner or upon the lowermost electric heater 88 which is a sheathed tubular heating element in the form of a square shaped loop. This heater 88 plugs into a receptacle 90 provided in the rear wall 30.

The shallow pan 86 also serves to support on either side two hairpin tubular heaters 92 and 94 which in Figure 1 are shown plugged into the receptacles 96 and 98. These receptacles 96 and 98 are tilted inwardly at an angle of about 15° so that the heaters 92 and 94 are likewise tilted to this angle. The heaters 92 and 94 and the parts associated with them are identical. Taking the heater 92 as an example, it is provided with a bracket 121 at its rear end which is connected to both sides of the heater 92. Each side of the heater 92 is provided with a connector prong 123 and 125. The bracket 121 is provided with a ground prong 127 having a downwardly projecting portion 129 extending through a slot 131 in the rear flange of the pan 86. This tongue 129 in the slot 131 connects the heater assembly of the heater 92 to the pan 86 so that when the pan 86 is withdrawn the heaters 92 and 94 together with their assembly will be withdrawn from the receptacles 96 and 98. The receptacle 96 has three openings which receive the three prongs 123, 127 and 125 to electrically connect the heater 92 to the heater circuit.

The heater 92 is provided with a second bracket 133. This bracket 133 is provided with two feet 135 and 137. The pan 86 is provided with an upwardly extending boss 139 provided with a slot 141 which receives the foot 141 while the boss 139 supports the bracket 133 at its proper angle of 15°. The foot 137 rests upon the bottom of the pan 86 so that a stable intermediate support is provided for the heater assembly. Fastened to the brackets 121 and 133 is a baffle 143 which extends from the bracket 121 beyond the front end of the heater substantially to the front edge of the pan 86. It is tilted at an angle of 15° like the heater 92 and shields the food in the oven from direct radiation from the heater 92. It causes air which is heated by the heater 92 to flow up the adjacent side wall 26 to heat the wall and to circulate the air within the oven compartment so that substantially uniform temperatures will prevail. The rear end of the heater 92 rests upon the rear flange of the pan 86 which is provided with a notch 145 for supporting the heater 92 at the desired angle of 15°.

Figure 2:
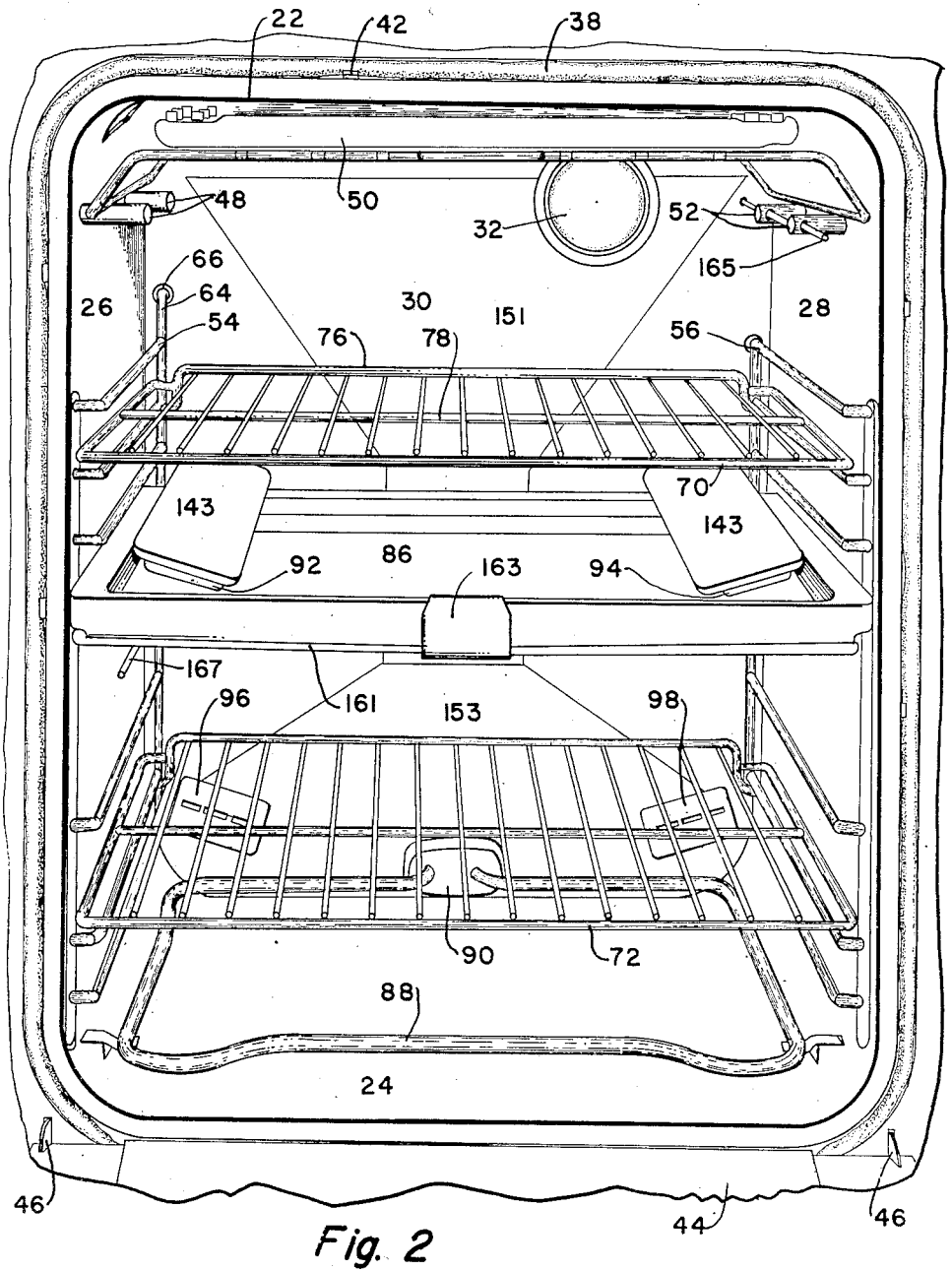
Figure 2 is a perspective view similar to Figure 1 but with the oven compartment divided into upper and lower sub-compartments.

The rear wall 30 is also provided with two additional receptacles 147 and 149 which are located at an intermediate height and similarly tilted at an angle of about 15°. These receptacles are adapted to receive the prongs of the heaters 92 and 94 when the pan 86 and the two heater assemblies of the heaters 92 and 94 are placed upon the fourth shelf guide as shown in Figure 2. When in this position the pan 86 substantially divides the oven compartment into an upper sub-compartment 151 and a lower sub-compartment 153. The shelf 70 may then be moved to one of the upper shelf guides. The shelf 72 may then be moved to one of the lower shelf guides.

The pan 86 on either side is provided with a longitudinal flange 155. Mounted upon these longitudinal flanges are the hook-shaped supports 157 and 159 of the drop door 161. These supports slide upon the longitudinal flange 155 so as to permit the lower or front edge of the drop door 161 to be held in the position shown in Figures 1 and 2 by the hook-shaped handle 163 at the front or lower edge of the drop door 161. This hook-shaped handle 163 hooks over the front flanged ends of the pan 86. The drop door makes it possible to close the lower compartment 153 so that it may be used for a baking operation separate from whatever cooking operation may be in progress in the upper compartment 151. For example this makes it possible to conduct a broiling operation in the upper compartment 151 embodying the broil heater 50 alone at full output with the door slightly open without affecting a baking operation in the lower compartment 153.

In the arrangement shown in Figures 2 and 3, for baking the upper compartment will be heated by the heaters 92 and 94 with the assistance of a reduced amount of heating from the broil heater 50. A thermostatic bulb 165 extends through apertures in the pins or projections 52 to control the heat provided by the heaters 92, 94 and 50 to maintain the upper sub-compartment 151 at the temperature desired. A second thermostatic bulb 167 is supported upon the projections 169 in the lower sub-compartment 153 for controlling the lower heater 88 to maintain the desired temperature in the lower sub-compartment 153. When the pan 86 and the heaters 92 and 94 are in the position shown in Figure 1 a switching arrangement is provided by which the lower heater 88 is deenergized and the thermostat 165 is effective to control the heaters 92 and 94 as well as the heater 50. However for broiling only the heater 50 is used at full output.

The ready removability of the pan 86 makes it most convenient to carry it to the sink for cleaning. The heaters 92 and 94 can be readily removed from the pan 86 to further facilitate cleaning. Because of their tubular sheathed construction, the heaters 88, 92 and 94 can also be readily cleaned.

While the form of embodiment of the invention as herein disclosed constitutes a preferred form, it is to be understood that other forms might be adopted as may come within the scope of the claims which follow.

What is claimed is as follows:

1. An electric oven including side, rear, top and bottom walls enclosing an oven compartment, a plurality of electrical receptacles upon said rear wall, a pan having raised side and end portions, means for movably supporting said pan for lateral movement into and out of said oven compartment, a long narrow heating unit extending adjacent to and parallel to each side of said pan and provided with connecting means for connection to said receptacles, each of said units being provided with a set of downwardly extending supporting projections of which one rests upon the bottom of said pan, said pan having a set of raised portions for supporting another projection of each of said sets of projections, the rear raised portion of said pan being provided with means for supporting the rear portion of each of said units substantially in alignment with said receptacles.

2. An electric oven including side, rear, top and bottom walls enclosing an oven compartment, a plurality of electrical receptacles upon said rear wall, a pan having raised side and end portions, means for movably supporting said pan for lateral movement into and out of said oven compartment, a long narrow heating unit extending adjacent to and parallel to each side of said pan and provided with connecting means for connection to said receptacles, each of said units being provided with a set of downwardly extending supporting projections of which one rests upon the bottom of said pan, said pan having a set of raised portions containing apertures for receiving another projection of each of said sets of projections.

3. An electric oven including side, rear, top and bottom walls enclosing an oven compartment, a plurality of electrical receptacles upon said rear wall, a pan having raised side and end portions, means for movably supporting said pan for lateral movement into and out of said oven compartment, a long narrow heating unit extending adjacent to and parallel to each side of said pan and provided with connecting means for connection to said receptacles, the raised rear portion of said pan adjacent each of said heating units being provided with an aperture, each of said heating units having a projection extending downwardly through said aperture providing a removable coupling between said units and said pan.

References Cited in the file of this patent

UNITED STATES PATENTS

| | | |
|---|---|---|
| 1,708,455 | Tinnerman | Apr. 9, 1929 |
| 1,755,691 | Heise | Apr. 27, 1930 |
| 1,974,983 | Cook | Sept. 25, 1934 |
| 2,078,681 | Otte | Apr. 27, 1937 |
| 2,116,669 | Dadson | May 10, 1938 |
| 2,186,857 | Davis | Jan. 9, 1940 |
| 2,279,525 | Rogers | Apr. 14, 1942 |
| 2,314,592 | McCormick | Mar. 23, 1943 |
| 2,415,768 | Shaw | Feb. 11, 1947 |
| 2,494,903 | Sheidler | Jan. 17, 1950 |
| 2,552,143 | Brock | May 8, 1951 |
| 2,605,759 | Phares | Aug. 5, 1952 |
| 2,622,181 | Sheidler | Dec. 16, 1952 |
| 2,668,221 | McCormick | Feb. 2, 1954 |

FOREIGN PATENTS

| | | |
|---|---|---|
| 654,196 | Great Britain | June 13, 1951 |